United States Patent [19]

Keeley

[11] Patent Number: 4,785,395

[45] Date of Patent: Nov. 15, 1988

[54] MULTIPROCESSOR COHERENT CACHE SYSTEM INCLUDING TWO LEVEL SHARED CACHE WITH SEPARATELY ALLOCATED PROCESSOR STORAGE LOCATIONS AND INTER-LEVEL DUPLICATE ENTRY REPLACEMENT

[75] Inventor: James W. Keeley, Nashua, N.H.

[73] Assignee: Honeywell Bull Inc., Waltham, Mass.

[21] Appl. No.: 879,864

[22] Filed: Jun. 27, 1986

[51] Int. Cl.[4] .............................................. G06F 15/16
[52] U.S. Cl. .................................................. 364/200
[58] Field of Search ... 364/200 MS File, 900 MS File

[56] References Cited

U.S. PATENT DOCUMENTS

| 4,173,781 | 11/1979 | Cenciev | 364/200 |
|---|---|---|---|
| 4,317,168 | 2/1982 | Messina et al. | 364/200 |
| 4,363,095 | 12/1982 | Woods et al. | 364/200 |
| 4,371,929 | 2/1983 | Brann | 364/200 |
| 4,392,200 | 7/1983 | Arulpragasam et al. | 364/200 |
| 4,426,681 | 1/1984 | Bacot | 364/200 |
| 4,429,363 | 1/1984 | Duke et al. | 364/200 |
| 4,466,059 | 8/1984 | Bastian | 364/200 |
| 4,622,631 | 11/1986 | Frank et al. | 364/200 |
| 4,695,943 | 9/1987 | Keeley | 364/200 |
| 4,747,043 | 5/1988 | Rodman | 364/200 |

Primary Examiner—Raulfe B. Zache
Assistant Examiner—Eric Coleman
Attorney, Agent, or Firm—Faith F. Driscoll; John S. Solakian

[57] ABSTRACT

A cache memory subsystem has multilevel directory memory and buffer memory pipeline stages shared by at least a pair of independently operated central processing units. For completely independent operation, each processing unit is allocated one-half of the total available cache memory space by separate accounting replacement apparatus included within the buffer memory stage. A multiple allocation memory (MAM) is also included in the buffer memory stage. During each directory allocation cycle performed for a processing unit, the allocated space of the other processing unit is checked for the presence of a multiple allocation. The address of the multiple allocated location associated with the processing unit having the lower priority is stored in the MAM allowing for earliest data replacement thereby maintaining data coherency between both independently operated processing units.

25 Claims, 5 Drawing Sheets

MULTIPROCESSOR COHERENT CACHE SYSTEM INCLUDING TWO LEVEL SHARED CACHE WITH SEPARATELY ALLOCATED PROCESSOR STORAGE LOCATIONS AND INTER-LEVEL DUPLICATE ENTRY REPLACEMENT

RELATED PATENT APPLICATIONS

1. The patent application of James W. Keeley and Thomas F. Joyce entitled, "Multiprocessor Shared Pipeline Cache Memory", filed on Sept. 27, 1984, bearing Ser. No. 655,473, which is assigned to the same assignee as this patent application.

2. The patent application of James W. Keeley and George J. Barlow entitled, "Read In Process Memory", filed on even date as this application, bearing Ser. No. 879,856, which is assigned to the same assignee as this patent application.

BACKGROUND OF THE INVENTION

1. Field of Use

The present invention relates to cache memory systems and more particularly to cache memory systems shared by a plurality of processing units.

2. Background

The related copending patent application titled, "Multiprocessor Shared Pipeline Cache Memory", discloses a cache memory subsystem which has two pipeline stages shareable by a plurality of sources including a number of independently operated central processing units. The first pipeline stage provides for a directory search and compare operation while the second pipeline stage performs the operations of fetching the requested data from the cache buffer memory and its transfer to the requesting source. Timing and control apparatus couples to the sources and allocates each processing unit, time slots which offset their operations by a pipeline stage. Thus, the processing units operate independently and conflict free.

In sharing a cache memory or main memory between a plurality of processing units, there can occur sequences of events or operations which can give rise to incoherency. To avoid this, one solution is to have the processing units share the available memory space and provide a locking mechanism which would prevent one processing unit from modifying information being accessed by another processing unit. While this solution works well for main memory, it can result in excessive data replacement or trashing which reduces the cache hit ratio. Additionally, this type of arrangement reduces the ability for each processing unit to operate independently.

Accordingly, it is a primary object of the present invention to provide a memory space allocation scheme which maximizes the independent operation of processing units which share a cache memory.

It is a further object of the present invention to maintain coherence in a cache memory system which is shareable by a plurality of independently operating processing units.

SUMMARY OF THE INVENTION

The above objects and advantages of the present invention are achieved in a preferred embodiment for a cache memory subsystem. The cache memory subsystem has multilevel directory memory and buffer memory pipeline stages shared by at least a pair of independently operated central processing units. For completely independent operation, each processing unit is allocated one-half of the total available cache memory space by separate accounting replacement apparatus included within the buffer memory stage.

A multiple allocation memory (MAM) is also included in the buffer memory stage. During each directory allocation cycle performed for a processing unit, the allocated space of the other processing unit is checked for the presence of a multiple allocation. The address of the multiple allocated location associated with the processing unit assigned the lower priority is stored in the MAM allowing earliest data replacement thereby maintaining data coherency between independently operated processing units.

In the cache subsystem of the preferred embodiment, each processing unit is assigned four levels of the directory memory corresponding to half of the total cache space. This arrangement reduces the complexity and amount of hardware required for implementing a least recently used (LRU) data replacement scheme. The LRU scheme was selected because it has been found more effective in improving the cache hit ratio. This type of LRU scheme disclosed in U.S. Pat. No. 4,334,289 has been found suitable for use in the preferred embodiment of the present invention.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DESCRIPTION OF THE SYSTEM OF FIG. 1

Figure 1:
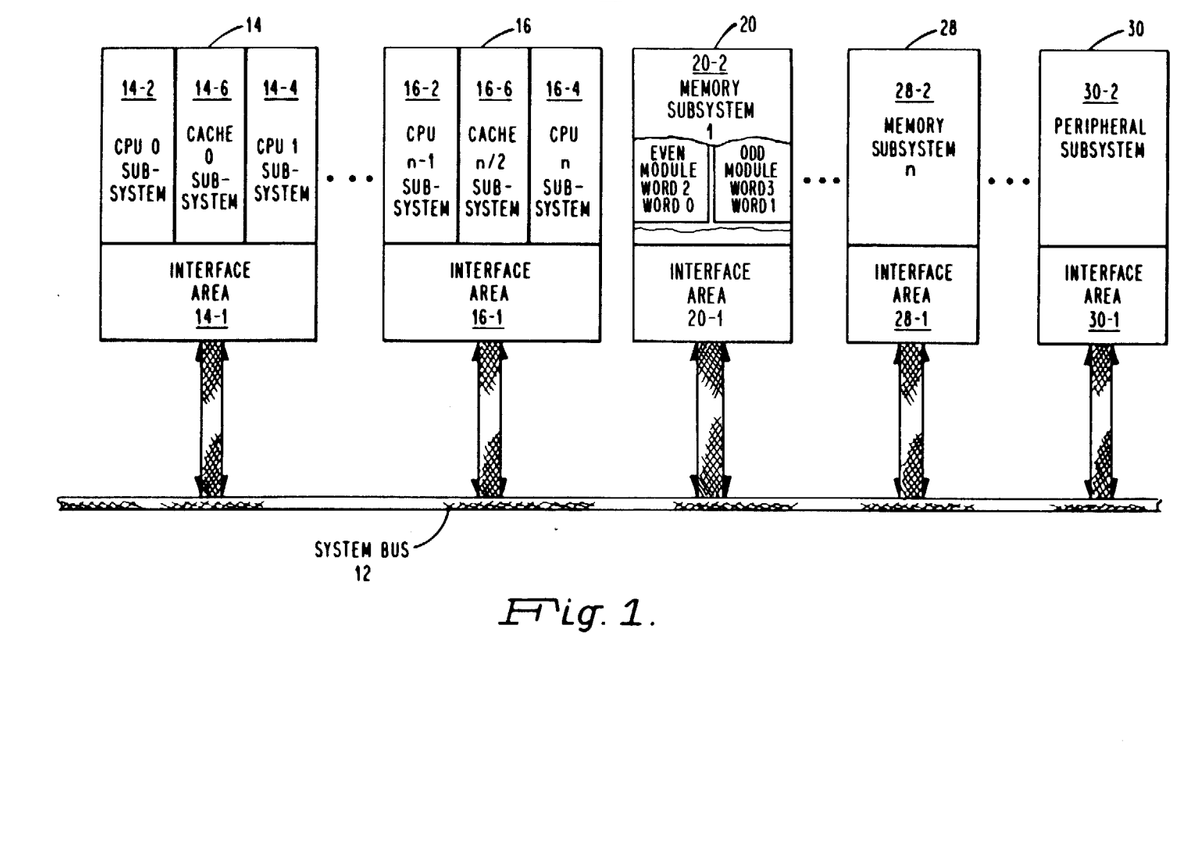
FIG. 1 is a block diagram of a system which includes the apparatus of the present invention.

FIG. 1 shows a multiprocessor data processing system 10 which includes a plurality of subsystems 14 through 30 which couple in common to a system bus 12. The illustrative subsystems include a plurality of central subsystems 14 through 16, a plurality of memory subsystems 20 through 28 and a peripheral subsystem 30. Each memory subsystem is organized to include even and odd memory modules. An example of such an arrangement is disclosed in U.S. Pat. No. 4,432,055.

Each subsystem includes an interface area which enables the unit or units associated therewith to transmit or receive requests in the form of commands, interrupts, data or responses/status to another unit on system bus 12 in an asynchronous manner. That is, each interface area can be assumed to include bus interface logic circuits such as those disclosed in U.S. Pat. No. 3,995,258, entitled "Date Processing System Having a Data Integrity Technique", invented by George J. Barlow.

Figure 2:
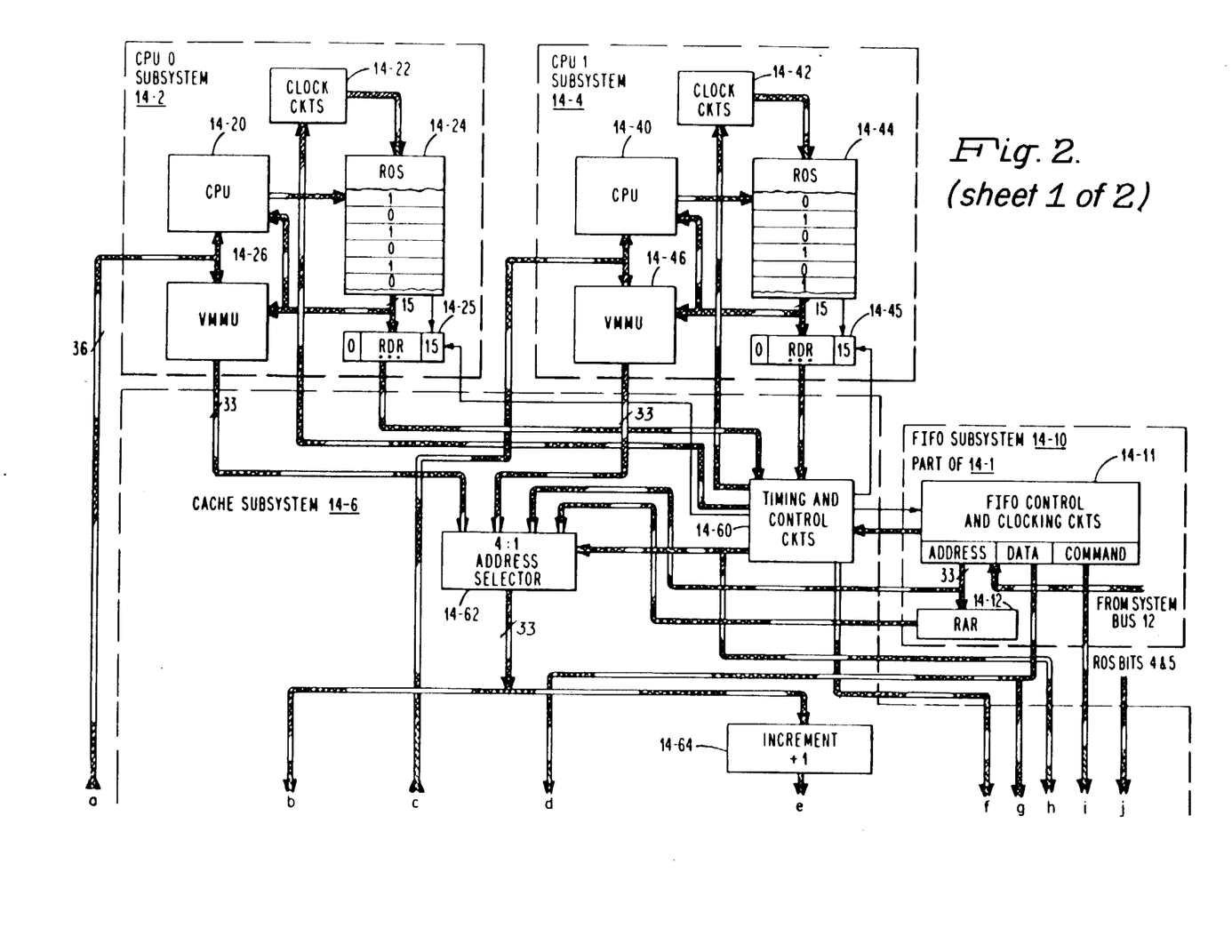
FIG. 2 is a block diagram of one of the central subsystems of FIG. 1 constructed according to the present invention.

The organization of each of the central subsystems 14 through 16 is the same. FIG. 2 shows in block diagram form the organization of central subsystem 14. Subsystem 14 includes a pair of central processing unit (CPU) subsystems 14-2 and 14-4 coupled to share a cache subsystem 14-6. The cache subsystem 14-6 couples to system bus 12 through a first in first out (FIFO) subsystem 14-10 which can be considered as being included within interface area 14-1.

As seen from FIG. 2, both CPU subsystems 14-2 and 14-4 are identical in construction. That is, each CPU subsystem includes a 32-bit central processing unit (CPU) (i.e., CPU's 14-20 and 14-40), and a virtual memory management unit (VMMU) (i.e., VMMU 14-26 and 14-46) for translating CPU virtual addresses into physical addressed for presentation to cache subsystem 14-6 as part of the memory requests. Also, each CPU subsystem includes a read out store (ROS) and a 16-bit ROS data output register (RDR) (i.e., ROS 14-25, 14-44 and RDR 14-25, 14-45).

At the beginning of each cycle, each ROS is conditioned to read out a 16-bit microinstruction word into its data output (RDR) register which defines the type of operation to be performed during the cycle (firmware step/box). The clock circuit within each CPU subsystem (i.e., circuits 14-22 and 14-42) establish the basic timing for its subsystem under the control or cache subsystem 14-6 as explained herein. The elements of each CPU subsystem can be constructed from standard integrated circuit chips.

As seen from FIG. 2, cache subsystem 14-6 is organized into a source address generation section and two separate pipeline stages, each with its own decode and control circuits. The source address generation section includes blocks 14-62 and 14-64 which perform the functions of source address selecting and incrementing. The first pipeline stage is an address stage and includes the directory circuits of blocks 14-66 through 14-76, arranged as shown. This stage performs the functions of latching the generated source address, directory searching and hit comparing. The first pipeline stage provides as an output information in the form of a level number and a column address. The operations of the first pipeline stage are clocked by timing signals generated by the timing and control circuits of block 14-60.

The information from the first stage is immediately passed onto the second pipeline stage leaving the first stage available for the next source request. The second pipeline stage is a data stage and includes the data buffer and associated memory circuits of blocks 14-80 through 14-96, arranged as shown. This stage performs the functions of accessing the requested data from the buffer memories 14-88 and 14-90, or replacing/storing data with data received from FIFO subsystem 14-10. Thus, the second pipeline stage provides a 36-bit data word for transfer to one of the CPU subsystems. Again, the operations of the second pipeline stage are clocked by timing signals generated by the timing and control circuits of block 14-60.

The different blocks of the first and second pipeline stages are constructed from standard integrated circuits, such as those described in the "The TTL Data Book, Column 3", Copyrighted 1984, by Texax Instruments Inc. and in the "Advanced Micro Devices Programmable Array Logic Handbook", Copyright 1983, by Advanced Micro Devices, Inc. For example, the address selector circuit of block 14-62 is constructed from two sets of six 74AS857 multiplexer chips cascaded to select one of four addresses. The swap multiplexer of block 14-92 is constructed from the same type chips. The latches of blocks 14-68 and 14-72 are constructed from 74AS843 D-type latch chips. The swap multiplexer and data register circuits of block 14-70 are constructed from a single clocked programmable array logic element, such as part AMPA16R6A, manufactured by Advanced Micro Devices, Inc.

Figure 3:
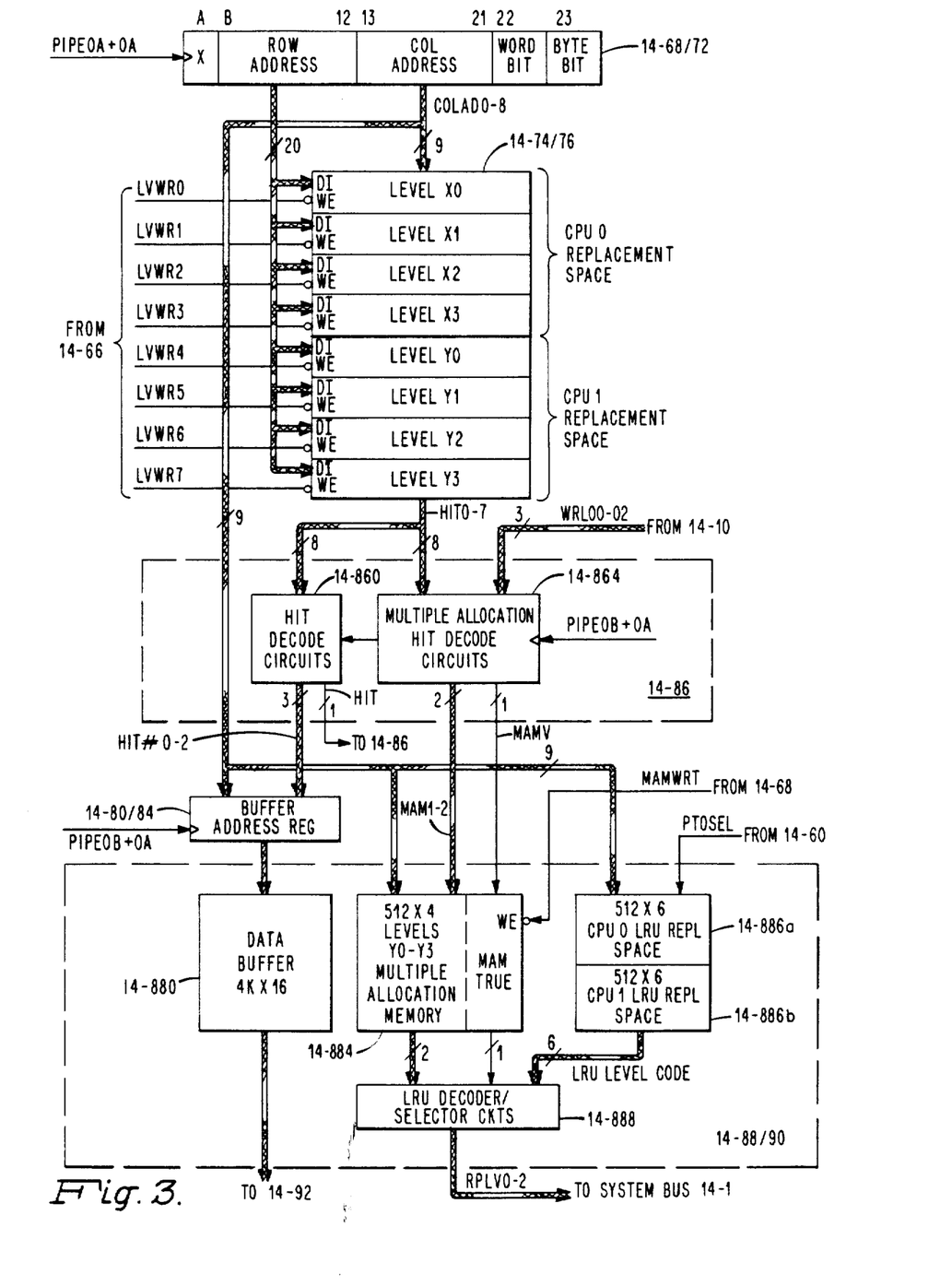
FIG. 3 shows in greater detail the circuits of the pipeline stages of FIG. 2.

The directory memories 14-74 and 14-76 shown in greater detail in FIG. 3 are constructed from 8-bit slice cache address comparator circuits having part number TMS2150JL, manufacutred by Texas Instruments Incorporated. The address and data registers 14-80 through 14-84 and 14-94 and 14-96 are constructed from 9-bit interface flip-flops having part number SN74AS823, manufactured by Texas Instruments, Inc.

The buffer and associated memory circuits 14-880, 14-884 and 14-886a/b shown in greater detail in FIG. 3 are also constructed from 4K×4-bit memory chips having part number IMS1421, manufactured by INMOS Corporation and 4096×1 static RAM chips having part number AM2147, manufactured by Advanced Micro Devices, Inc. The address increment circuits of block 14-64 are constructed from standard ALU chips designated by part number 74AS181A and a programmable array logic element having part number AmPAL16L8A, manufactured by Advanced Micro Devices, Inc.

The first and second levels of command register and decode circuits of block 14-66 and 14-86, respectively, utilize clocked programmable array logic elements having part numbers AmPAL16R4A and AmPAL16R6A, manufactured by Advanced Micro Devices, Inc. These circuits generate the required selection, read and write control signals as indicated in FIG. 2 (i.e., signals SWAPLT+00, SWAPRT+00, P0LDDT−OL, P1LDDT−OL, P0LDDFOR, F1LDDT−OR). For further details, reference may be made to the equations of the Appendix.

As seen from FIG. 2, cache subsystem 14-6 is organized into even and odd sections which permit two data words to be accessed simultaneously in response to either an odd or even memory address. For further information about this type of cache addressing arrangement, reference may be made to U.S. Pat. No. 4,378,591 which is assigned to the same assignee as named herein.

FIG. 2 also shows in block form, FIFO subsystem 14-10 which includes the FIFO control and clocking circuits of block 14-11 which couples to a replacement address register 14-12 and to system bus 12. FIFO subsystem 14-10 receives all of the information transferred between any two subsystems on system bus 12. When the information is for updating data in main memory, the information is coded to indicate such updating or replacement operation. FIFO subsystem 14-10 also receives any new data resulting from a memory request being forwarded to system bus 12 by cache subsystem 14-6. Both update and new data are stored as requests within a buffer memory included within subsystem 14-10.

FIFO control circuits decode each request and initiate the appropriate cycles of operation which result in address, data and commands being applied to different parts of cache subsystem 14-6 as seen from FIG. 2. For the purpose of the present invention, FIFO subsystem can be considered conventional in design and take the form of the type of FIFO circuits disclosed in U.S. Pat.

No. 4,195,340 which is assigned to the same assignee as named herein.

The basic timing for each of the subsystems of FIG. 2 is established by the timing and control circuits of block 14-60. Such control permits the conflict-free sharing of cache subsystem 14-6 by CPU sybsystems 14-2 and 14-4 and FIFO subsystem 14-10. The circuits of block 14-60 are described in greater detail in the first related patent application. Briefly, these circuits include address select logic circuits which generate control signals for conditioning address selector 14-62 to select one of the subsystems 14-2, 14-4 and 14-10 as a request address source.

Also, block 14-60 includes pipeline clock circuits of block 14-620 which define the different types of cache memory cycles which can inititate the start of the pipeline resulting in the generation of a predetermined sequence of signals in response to each request. That is, first and second signals, respectively, indicate a cache request for service by CPU0 subsystem 14-2 and CPU1 subsystem 14-4 while other signals indicate cache request for service by FIFO subsystem 14-10.

These requests can be summarized as follows:

1. CPU0 READ CYCLE

A CPU0 read occurs in response to a cache request inititated by ROS 14-24 during a first time slot/interval when CPU port 0 within interface 14-1 is not busy. The address supplied by CPU0 subsystem 14-2 is furnished to the first pipeline stage and the directory is read. When a hit is detected, indicating that the requested data is stored in the data buffer, the buffer is read and the data is clocked into the CPU0 data register. When a miss is detected, the CPU0 port is made busy, the request is forwarded to memory to fetch the requested data.

2. CPU1 READ CYCLE

A CPU1 read occurs in response to a cache request initiated by ROS 14-44 during a third time slot/interval when CPU port 1 within interface 14-1 is not busy.

3. SECOND HALF BUS CYCLE

A second half bus cycle occurs in response to a first type of cache request initiated by FIFO subsystem 14-10 for data requested from either main memory or an I/O device being returned on system bus 12 during a first or third time slot/interval when FIFO subsystem 14-10 has a request stored. When FIFO subsystem 14-10 furnishes data from an I/O device to the first pipeline state, it passes therethrough without changing the states of any memories and is clocked into the appropriate CPU data register. Data from main memory is written into the cache data buffers and is clocked into the appropriate CPU data registers.

4. MEMORY WRITE UPDATE CYCLE

A memory write update cycle occurs in response to a second type of cache request initiated by FIFO subsystem 14-10 for replacement or update data received from system bus 12, upon acknowledgement of such data during a first or third time slot/interval when FIFO subsystem 14-10 has a request stored. FIFO subsystem 14-10 furnishes data to the first pipeline stage resulting in the reading of the directory memory. When a hit is detected, the replacement data is written into the buffer memory.

5. FIFO ALLOCATION CYCLE

A FIFO allocation occurs in response to a CPU0 or CPU1 READ CYCLE which results in a miss being detected. The CPU port is made busy and the request if forwarded to memory to fetch the requested data. Upon the memory read request being acknowledge, the CPU read request is loaded into the FIFO subsystem registers and control circuits included in the subsystem initiate a request for a FIFO cycle of operation (i.e., force signal CYFIFO=1), signals specifying the type of request and level number information are applied as inputs to the command register and decode circuits of block 14-66. These signals include FIMREF (memory reference), $\overline{\text{FIWRIT}}$ (memory read) and FIDT16-18/19-21 (level number). The signals FIMREF and $\overline{\text{FIWRIT}}$ initiate a FIFO allocation cycle (i.e., FIALOCYC=1).

FIG. 3 shows the organization of the even and odd directory and buffer memory pipeline stages according to the present invention. As seen from FIG. 3, the 4K×20-bit directory memory 14-74/76 is divided into two equal spaces. The first four levels designated X0 through X3 are assigned to CPU0 while the next four levels designated Y0 through Y3 are assigned to CPU1.

The directory memory 14-74/76, in response to a cache address, generates eight bit output signals (HIT0-7) which are applied to the hit decode circuits of block 14-68. Row address information is written into a particular level when a corresponding one of the write enable signals LVWR0 through LVWR7 is forced to a binary ZERO by the circuits of block 14-66. For further details, reference may be made to the equations in the Appendix.

The hit decode circuits of block 14-86 include the hit decode circuits of block 14-860 and the multiple allocation hit decode circuits of block 14-864. In the preferred embodiment, separate PLA elements are used to construct the circuits of each of the blocks 14-860 and 14-864. Both of these circuits include priority encoder circuits which operate to select the higher priority level when more than one hit output is present. The priority is based on the level number value with level 0 having the highest priority and level 7 having the lowest priority.

In response to hit output signals HIT0-7, hit decode circuits 14-860 generate three bit hit number code corresponding to signals HIT#0-2 in addition to hit output signal HIT used to signal the occurrence of a hit condition. The multiple allocation hit decode circuits 14-864 in response to level number signals WRL00-O2 received from FIFO subsystem 14-10 and signals HIT 0-7 operate to generate a two-bit code corresponding to signals MAM1-2 indicating the lower priority level at which a multiple allocation hit occurred in addition to multiple allocation memory signal MAMV. For further details as to how the signals are generated, reference may be made to the equations of the Appendix.

The sets of hit output signals are applied to the data buffer and associated memory circuits of block 14-88/90. As shown, these circuits include 4K × 16-bit data buffer 14-880 and a 512×4-bit multiple allocation memory (MAM) 14-884 which receives as data inputs, signals MAM1-2 and MAMV. The memory 14-884 is enabled for writing by signal MAMWRT from write control circuits of block 14-68. The output signals from MAM 14-884 which includes a two-bit level code and MAMV hit signal are applied as an input to the LRU decoder/selector circuits of block 14-888.

Additionally, block 14-88/90 includes a pair of 512×6-bit LRU memory replacement circuits 14-886a and 14-886b, which are associated with CPU0 and CPU1 as indicated. As mentioned, the LRU memory replacement circuits 14-886a and 14-886b take the form of the LRU circuits disclosed in U.S. Pat. No. 4,334,289.

One of the 512×6 LRU arrays is enabled for read out of a 6-bit LRU level code as a function of the state of CPU select signal PT0SEL from the circuits of block 14-60. When signal PT0SEL is a binary ONE indicating a CPU0 cycle, LRU memory 14-886a is enabled. Conversely, when signal PT0SEL is a binary ZERO indicating a CPU1 cycle, LRU memory 14-886b is enabled. The 6-bit LRU level code is applied as a second input to the circuits of block 14-888.

The LRU decoder/selector circuits of block 14-888 as a function of the state of the MAM hit bit, select the MAM level bits or the decoded LRU level code bits as the source of the replacment level signals RPLV0-2 which are forwarded to interface area 14-1. The LRU decoder/selector circuits of block 14-888 include priority decoder circuits which convert the 6-bit LRU level code read out from the LRU memory array into a 3-bit code representing the least recently used replacement level. This decoding may be carried out in the manner described in U.S. Pat. No. 4,334,289. However, for the purpose of the present invention, the decoding can be considered conventional.

Also, the circuits of block 14-888 include selection circuits which are conditional to provide as an output, either the 3-bit code from the priority decoder circuits or the MAM level code. Since it is only necessary to eliminate duplicate data entries in the space allocated to the lower priority processing unit CPU1, only a two-bit code is required to designate the four levels 4-7 utilized by CPU1 along with signal MAMV.

DESCRIPTION OF OPERATION

With reference to the flow diagram of FIG. 4, the operation of the apparatus of the present invention shown in FIG. 3 will now be described. In the system of FIG. 1, each of the processing units CPU0 and CPU1 can initiate read and write request in main memory subsystem 20. When one of the processing units (e.g. CPU0) generates a memory read request for data word 0 stored in location A0 which is not stored in cache and the other processing unit (e.g. CPU1) makes another memory read request for the same data word, both processing units will cause misses and their requests will be forwarded to main memory subsystem 20. This results in the allocation of the same location being made at two different levels. Since both CPU0 and CPU1 operate independently, the multiple allocation can cause incoherency in that one of these locations containing the most recent data could be replaced before the replacement of location containing the same data which is not being updated. That is, the hit decode circuits 14-860 of FIG. 3, in response to signals HIT0-7 from directory memory 14-74/76 of FIG. 3, operate to generate a hit level code indicating the highest priority level at which a hit occurred. This means that only the space assigned to CPU0 will be continuously updated.

As mentioned, each CPU has its own replacement space and LRU accounting circuits. These circutis are the same for both even and odd cache sections. Thus, while CPU0 and CPU1 can only replace data in their assigned spaces (i.e., write new data), each can read and update data in the other's space. Hence, when there are two directory addressed allocated to the same piece of data, the data being accessed by CPU0 or CPU1 could be incoherent. The apparatus of the present invention ensures data coherency while still preserving independent operation between processing units.

Figure 4:
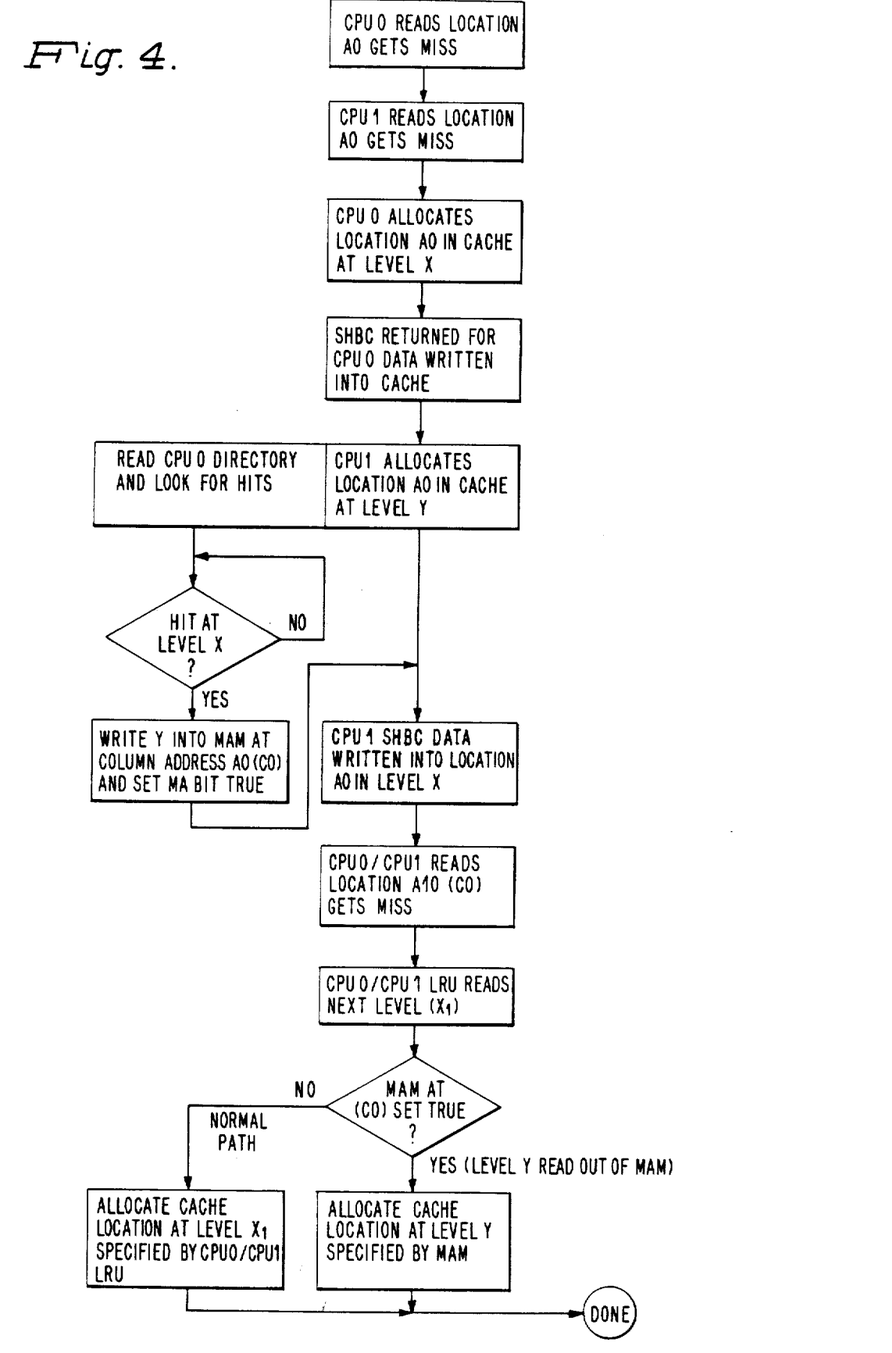
FIG. 4 is a flow diagram used to explain the operation of the apparatus of the present invention.

As seen from FIG. 4, CPU0 and CPU1 issue successive read requests to the same location A0 which results in miss conditions. During the first half of the bus cycle of the first read request, the cache subsystem 14-6 performs an allocation cycle which allocates location A0 in directory 14-74/76 at one of the X levels in response to a read request from CPU0 received from FIFO subsystem 14-10. That is, the read request is presented to the cache subsystem 14-20 by FIFO subsystem 14-10 and the cache row address is written into the location designated by the cache column address in one of the levels assigned to CPU0 specified by a write enable signal from the circuits of block 14-66.

When the requested data words are returned during the second half bus cycle, this results in a cache SHBC cycle during which the received data stored in data register 14-82 is written into data buffer 14-880 at the X level specified by the cache column address and hit level signals HIT#0-2 loaded into the buffer address register 14-80/84. As seen from FIG. 4, in response to the memory read request issued by CPU1, the cache subsystem 14-6 performs another allocation cycle which results in the allocation of location A0 in directory 14-74/76 at one of the Y levels. At the same time that the cache row address is being written into the designated one of the levels assigned to CPU1, the higher priority levels X0-X3 are being read and checked for hits. That is, the multiple allocation hit decode circuits 14-684 operate to detect the presence of any hits in levels X0-X3.

Since location A0 in one of the X levels was previously allocated for the same column address C0, the result is that the circuits operate to generate output signals MAM1-2 and MAMV coded to indicate the occurrence of a multiple allocation hit at the same column address in one of the levels X0-X3 and in one of the levels Y0-Y3 being written into by CPU1. As seen from FIG. 4, the output signals MAM1-2 and MAMV are written into the MAM location specified by the cache column address. That is, the two-bit code designating one of the Y levels is written into the column address C0 of location A0 and the MAM bit is set to a binary ONE.

Upon the return of the data words requested by CPU1, during a subsequent SHBC cycle, the cache subsystem 14-6 writes the data into location A0 of the specified level X in cache buffer 14-880. Due to the high priority, memory data is again written into location A0 of cache data buffer 14-880. At this time, the directory memory 14-74/76 contains two levels, one X level and one Y level, which contain the same row address and are designated by the same column address (C0). Since level X has a higher priority than level Y, the allocated location in level Y is redundant and will not be coherent, since it is not being updated.

The apparatus of the present invention allows CPU0 in addition to CPU1 to replace the contents of the redundant location in the space assigned to CPU1 rather than in its own space. This guarantees that the replacement occurs immediately which is the next time there is an opportunity to replace a location at the same cache column address (C0). This ensures that both processing units only have access to coherent data.

In greater detail, when either CPU0 or CPU1 request data from another location, such a location A10 having the same cache column address C0 which is not stored in cache, the circuits 14-680 generate a miss condition. This causes cache subsystem 14-6 to perform another allocation cycle during which the LRU accounting circuits 14-886a operate to generate a 6-bit LRU level code designating the next replacement level (e.g. X1) into which the data received from main memory subsystem 20 is to be written.

As shown in FIG. 4, during the CPU read cycle, the cache column address C0 addresses MAM 14-88 reading out signals MAM1-2 and MAMV. Since the MAM bit was set, it conditions the circuits of block 14-888 to transfer signals MAM1-2 designating level Y as the next level to be replaced at that column address C0. Accordingly, these signals RPLV0-2 are transferred to interface area 14-1 and during the subsequent allocation cycle, the cache row address is written into directory 14-74/76 at location A10 at column address C0 of level Y as specified by MAM 14-88.

When the MAM bit is not set to a binary ONE, the cache row address is written into directory 14-74/76 at the location specified by the cache column address in level X1 as designated by the CPU's LRU accounting circuits. Since the CPU's LRU accounting circuits are updated only during a hit condition, there is no change in the status of these circuits.

Summarizing the above, the signals PRLV0-2 are coded as follows. When signal MAMV=1, then signals RPLV0-2=1, MAM1, MAM2. When signal MAMV=0, then signals RPLV0-2=decode of the 6-bit LRU level code. The values of signals RPLV0-2 when signal MAMV is a ONE are as follows:

RPLV0-2=100 (replace level 4),
RPLV0-2=101 (replace level 5),
RPLV0-2=110 (replace level 6),
RPLV0-2=111 (replace level 7).

As seen from the above, the apparatus of the present invention is able to maintain cache coherency while allowing each of the processing units sharing a cache subsystem to operate independently in an efficient manner.

APPENDIX

The equations for generating the signals of FIGS. 2 and 3 are given by the following Boolean expressions:

$$\text{*P0LDDT-OL} = \text{CPUCYL} \cdot \overline{\text{CPUNUM}} \cdot \text{DBWDRD} \cdot \text{EVNHIT} \cdot \overline{\text{ODDHIT}} \quad 1.$$

$$\frac{\text{CPU READ CYCLE}}{+\text{CPUCYL} \cdot \overline{\text{CPUNUM}} \cdot \text{DBWDRD} \cdot \text{CMAD22} \cdot \overline{\text{CMAD23}} \cdot \text{EVNHIT}}$$

$$\frac{\text{CPU READ CYCLE}}{+\text{CPUCYL} \cdot \overline{\text{CPUNUM}} \cdot \text{DBWDRD} \cdot \text{CMAD22} \cdot \overline{\text{CMAD23}} \cdot \text{ODDHIT}}$$

$$\frac{\text{CPU READ CYCLE}}{+\overline{\text{CPUCYL}} \cdot \text{FIAD17} \cdot \text{FISHBA} \cdot \text{RPMREF}}$$

$$\frac{\text{I/O SHBC}}{+\overline{\text{CPUCYL}} \cdot \text{FIAD17} \cdot \text{FISHBA} \cdot \text{RPMREF}.}$$

MEM SHBC $$\text{*P0LDDT-OR} = \text{CPUCYL} \cdot \overline{\text{CPUNUM}} \cdot \text{DBWDRD} \cdot \text{EVNHIT} \cdot \text{ODDHIT} \quad 2$$

$$\frac{\text{CPU READ}}{+\text{CPUCYL} \cdot \overline{\text{CPUNUM}} \cdot \text{DBWDRD} \cdot \text{CMAD22} \cdot \text{EVNHIT}}$$

$$\frac{\text{CPU READ}}{+\text{CPUCYL} \cdot \overline{\text{CPUNUM}} \cdot \text{DBWDRD} \cdot \text{CMAD22} \cdot \text{ODDHIT}}$$

$$\frac{\text{CPU READ}}{+\overline{\text{CPUCYL}} \cdot \text{FIAD17} \cdot \text{FISHBA} \cdot \text{RPMREF}}$$

$$\frac{\text{I/O SHBC}}{+\overline{\text{CPUCYL}} \cdot \text{FIAD17} \cdot \text{FISHBA} \cdot \text{RPMREF}}$$

I/O SHBC

*P1LDDT-OL = same as 1 except $\overline{\text{CPUNUM}}$ = CPUNUM.  3.

*P1LDDT-OR = same as 2 except $\overline{\text{CPUNUM}}$ = CPUNUM.  4.

*SWAPLT = CPUCUL · CMAD22  5.

$$\frac{\text{CPU READ}}{+\text{CPUCYL} \cdot \text{FISHBA} \cdot \text{RPMREF} \cdot \text{RPAD22}.}$$

MEM SHBC

*SWAPRT = + CPUCYL · DBWDRD · CMAD22  6.

$$\frac{\text{CPU READ}}{+ \text{CPUCYL} \cdot \overline{\text{DBWDRD}} \cdot \overline{\text{CMAD22}}}$$

CPU READ
+CPUCYL·FISHBA·RPMREF·
(FIDBWD·RPAD22 + $\overline{\text{FIDBWD}}$·$\overline{\text{RPAD22}}$)

MEM SHBC

HIT = HIT0 + HIT1 + HIT2 + HIT3 + HIT4 + HIT5 + HIT6 + HIT7.  7.

$\overline{\text{HIT\#0}}$ = HIT0 + HIT1 + HIT2 + HIT3.  8.

10.

$\overline{\text{HIT\#1}}$ = HIT0 + HIT1 + HIT4 + $\overline{\text{HIT2}}$·HIT3 + HIT5 + $\overline{\text{HIT2}}$·HIT3.

$\overline{\text{HIT\#2}}$ = HIT0 + HIT2 + $\overline{\text{HIT1}}$ + HIT4 + $\overline{\text{HIT3}}$·HIT1 +   10.

HIT6 + $\overline{\text{HIT5}}$·HIT3·HIT1.

MAMV = WRL00·(HIT0 + HIT1 + HIT2 + HIT3) +   11

$\overline{\text{WRL00}}$·(HIT4 + HIT5 + HIT6 + HIT7).

12.
MAM1 = WRL01·(HIT0 + HIT1 + HIT2 + HIT3) + HIT6 + HIT7.

13.
MAM2 = WRL02·(HIT0 + HIT1 + HIT2 + HIT3) + HIT5 + HIT7.

MAMWRT = $\overline{\text{FIALOCYC}}$·WRTPLS.  14.

PTOSEL = TM1AD2·$\overline{\text{PTOBSY}}$·PORD02.  15.

FIALOCYC = FIMREF·FIWRIT.  16.

FIUPDATE = FIMREF·FIWRIT.  17.

LVWR0 = WRTPLS·(FIDT16·$\overline{\text{FIDT17}}$·FIDT18 + FIDT19·  18.

$\overline{\text{FIDT20}}$·FIDT21)·FIALOCYCL.

-continued

LVWR7 = WRTPLS·(FIDT16·FIDT17·FIDT18 + FIDT19· FIDT20·FIDT21)·FIALOCYCL.   19.

WRL00–WRL02 = FIDT16–18 or FIDT19–21.6   20.

*These signals are clocked with signal PIPE0+0A.

DESCRIPTION OF EQUATION TERMS

1. DBWDRD = Double word read command defined by ROS data bit 4=1 and ROS data bit 5=0 generated by the decode circuits of block 14-66 which is clocked with signal PIPE0A+0A.
2. CPUNUM = CPU number (CPU0 or CPU1) signal generated by the circuits of block 14-66 which is clocked with signal PIPE0A+0A.
3. CPUCYL = CPU cycle signal generated by the circuits of block 14-66 and which is clocked with signal PIPE0A+0A.
4. EVNHIT = HIT signal generated by the hit decode circuits 14-680 associated with the even directory memory 14-76.
5. CMAD22 = Cache memory address bit 22 generated at the output of selector 14-62.
6. CMAD22 = Cache memory address bit 23, generated at the output of selector 14-62, specifies which half (left or right) of data register 14-94 or 14-96 is to be loaded with a data word.
7. FIAD17 = FIFO address bit 17 from FIFO subsystem 14-10 defines which CPU is to receive the replacement data.
8. FIDBWD = FIFO double-wide word command bit from FIFO subsystem 14-11 specifies when the data being returned has two words.
9. FISHBA = FIFO second half bus cycle acknowledge signal from 14-11 specifies that the FIFO subsystem requires a cache cycle to process data received from an I/O device or memory during a second half bus cycle SHBC.
10. ODDHIT = HIT signal generated by the hit decode circuits 14-680 associated with the odd directory memory 14-74.
11. RPMREF = Memory reference signal provided by RAR 14-12 which permits any exception conditions to be taken into account.
12. RPAD22 = Replacement address bit 22 from RAR 14-12.
13. FIDT16-18/19-21 = The even/odd data bits defining the cache level provided by the FIFO subsystem 14-10.
14. CYFIFO = A cycle signal generated by the FIFO cycle select logic circuits of block 14-60 during a free pipeline stage.
15. FISHBC = The second half bus cycle signal from FIFO subsystem 14-10.
16. WRTPLS = The write pulse signal generated by the circuits of block 14-60 which occurs midway between either clocking signals PIPE0A+0A AND PIPE0A+0B or clocking signals PIPE0B+0A and PIPE0B+0B.
17. FIMREF = The bus memory reference signal BSMREF from FIFO subsystem 14-10.
18. FIWRIT = The bus memory write signal BSWRIT from FIFO subsystem 14-10.
19. TM1AD2 = Time slot allocated to CPU0.
20. PTOBSY = Signal from interface area 14-1 indicating that CPU0 is not busy.
21. PORD02 = The state of bit position 2 of ROS14-24 indicating that CPU0 has requested a cycle of operation.

It will be appreciated by those skilled in the art that many changes may be made to the preferred embodiment of the present invention. For example, the MAM memory could be used to track duplicate entries in all of the cache levels for signalling other error conditions. The invention is not limited to the number of processing units, the size of memory, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system comprising:
    a pair of independently operated processing units, each processing unit being operative to generate cache requests for data, each request including an address having first and second address portions; and
    a cache memory subsystem coupled to said pair of processing units for receiving said requests, said cache memory subsystem comprising:
    a directory store being divided equally into first and second pluralities of levels, said first and second pluralities of levels each containing groups of storage locations, each location for storing said first address portion of a memory request generated by each of said pair of processing units allocated to said first and second pluralities of levels and each different group of locations within said plurality of directory store levels being defined by a different one of said second address portions;
    a data store being divided equally into the same first and second plurality of levels as said directory store and each different group of locations within said data store levels being accessed by a different one of said second address portions;
    first and second accounting means being associated with said first and second pluralities of levels of said cache store respectively and each accounting means containing said first plurality of levels for storing information establishing the order for replacing locations within said levels on a least recently used basis; and
    multiple allocation memory (MAM) means including said first plurality of levels of said groups of locations, each different group of locations being accessed by said second address portion; and,
    decode and control means coupled to said directory store, to said MAM means, said decode and control means during each allocation cycle generating signals for indicating when the same first address portion stored in a location defined by said second address portion of one of said pluralities of levels allocated to one processing unit is being written into a location defined by the same second address portion in one of said pluralities of levels allocated to the other processing unit resulting in a duplicate entry in said directory store; and
    said MAM means storing signals specifying the directory store level of said duplicate entry specified by a cache request from one of said pair of processing units and a signal indicating the occurrence of a multiple allocation in response to said signals from said decode and control means, said MAM means during a next allocation cycle in response to a cache request having the same second address portion reading out said level and multiple allocation signals for immediate replacement of said duplicate entry ensuring that data coherency is maintained in said cache store.

2. The system of claim 1 wherein said directory store includes means for generating a plurality of hit signals for indicating when and the level where the requested data is stored in said cache data store and at which one of said first and second pluralities of levels.

3. The system of claim 2 wherein said decode and control means includes first programmable logic array (PLA) circuit means coupled to said means for generating, to receive said hit signal generated from reading the plurality of levels assigned to said one processing unit and to said first and second accounting means for receiving level signals indicating the next level into which new data is being written by said other processing unit, said first PLA circuit means upon detecting a match between said hit signals and said level signals generating said signals signalling said duplicate entry.

4. The system of claim 3 wherein one of said processing units is assigned a lower priority than the other processing unit, said first PLA circuit means including priority circuit means for generating said signals specifying the directory level of said duplicate entry from said processing unit having said lower priority for said immediate replacement of duplicate entries in said plurality of levels assigned to said lower priority processing unit.

5. The system of claim 4 wherein said cache subsystem coupled in common with other processing units to a system bus and wherein said decode and control means further includes second programmable logic array (PLA) circuit means coupled to said means for generating, said PLA circuit means including priority circuit means, said PLA circuit means in response to said hit signals generating hit level code signals indicating the highest priority level at which a hit was detected, said cache store being conditioned by said hit level code signals during each update cycle to update the contents of locations within said first and second pluralities of levels on a priority basis for maintaining coherency.

6. The system of claim 5 wherein said cache subsystem further includes FIFO listener means coupled to said system bus and to said directory store and to said decode and control means, said FIFO listener means in response to each memory write request applied to said system bus by another processing unit and acknowledged by said main memory storing and subsequently presenting said each memory write request in a synchronous manner to said directory store and to said cache store during said update cycle for synchronizing the receipt of asynchronously generated requests from said bus with the operation of said cache subsystem.

7. The cache unit of claim 1 wherein said directory store includes:
an even directory memory having a plurality of locations for storing a plurality of even addresses; and
an odd directory memory having a plurality of locations for storing a plurality of odd addresses; and wherein
said buffer memory means includes:

an even buffer memory having a plurality of storage locations associated with a different one of a plurality of even addresses; and
an odd buffer memory having a plurality of storage locations associated with a different one of a plurality of odd addresses; and
said MAM means includes;
an even MAM memory; and
an odd MAM memory associated with said even buffer memory and said odd buffer memory respectively.

8. The system of claim 1 wherein said cache memory subsystem further includes decode and selector circuit means coupled to said MAM means and to said first and second accounting means, said decode and selector circuit means being conditioned by said signal indicating the occurrence of said multiple allocation to transfer said signals specifying said directory store level from said MAM means for indicating the next level into which new data is to be written into said cache store.

9. The system of claim 8 wherein said first and second accounting means each include a memory containing the same number of locations as said first and second pluralities of levels, said locations storing least recently used (LRU) encoded level codes for indicating the order of usage of said locations, said decode and selector circuit in the absence of said signal indicating the occurrence of said multiple allocation being conditioned to decode the LRU level code contents of said location specified by said second address portion for transfer indicating the next level into which new data is to be written into said cache store.

10. A data processing system comprising:
a pair of independently operated processing units, each processing unit being operative to generate memory request for data, each request including an address having first and second address portions; and
a cache memory subsystem coupled to said pair of processing units for receiving said requests, said cache memory subsystem comprising:
a first stage including a directory store being divided equally into first and second pluralities of levels, said first and second pluralities of levels, each plurality containing groups of storage locations, each location for storing said first address portion of a memory request generated by each of said processing units allocated said first and second plurality of levels and each different group of locations within said plurality of directory store levels being defined by a different one of said second address portions;
a second stage including a data store being divided equally into the same first and second plurality of levels as said directory store and each different group of locations within said data store levels being accessed by a different one of said second address portions;
first and second accounting means being associated with said first and second pluralities of levels of said cache store respectively, each accounting means containing said first plurality of levels for storing information establishing the order of replacing locations within said levels on the basis of usage;
multiple allocation memory (MAM) means including said first plurality of levels of said groups of locations and each different group of locations being accessed by said second address portion; and, selector means coupled to said MAM means and to said first and second accounting means; and, decode and control means coupled to said directory store, to said MAM means, said decode and control means being operative during each allocation cycle to generate signals for indicating when the same first address portion stored in a location defined by said second address portion of one of said first levels allocated to one processing unit being written into a location defined by the same second address portion in one of said plurality of levels allocated to the other processing unit resulting in a duplicate directory entry; and said MAM means being conditioned by said decode and control means to store signals specifying the directory store level of a predetermined one of said pair of processing units and a multiple allocation memory (MAM) signal indicating the occurrence of a multiple allocation, said MAM means in response to the same second address portion during a next allocation cycle in which a location specified by the same second address is being allocated in another one of said first or second pluralities levels, reading out said stored level and MAM allocation signals, said selector means being conditioned to specify said stored level from said MAM means as a replacement location eliminating said duplicate entry ensuring that coherent data is maintained in said cache store.

11. The system of claim 10 wherein said directory store includes means for generating a plurality of hit signals for indicating when and the level where the requested data is stored in said cache data store and at which one of said first and second pluralities of levels.

12. The system of claim 11 wherein said decode and control means includes first programmable logic array (PLA) circuit means coupled to said means for generating, to receive said hit signals generated from reading the plurality of levels assigned to said one processing unit and to said first and second accounting means for receiving level signals indicating the next level into which new data is being written by said other processing unit, said first PLA circuit means upon detecting a match between said hit signals and said level signals generating said signals signalling said duplicate entry.

13. The system of claim 12 wherein one of said processing units is assigned a lower priority than the other processing unit, said first PLA circuit means including priority circuit means for generating said signals specifying the directory level of said duplicate entry from said processing unit having said lower priority for said immediate replacement of duplicate entries in said plurality of levels assigned to said lower priority processing unit.

14. The system of claim 13 wherein said cache subsystem coupled in common with other processing units to a system bus and wherein said decode and control means further includes second programmable logic array (PLA) circuit means coupled to said means for generating, said PLA circuit means including priority circuit means, said PLA circuit means in response to said hit signals being operative to generate hit level code signals indicating the highest priority level at which a hit was detected, said cache store being conditioned by said hit level code signals during each update cycle to update the contents of locations within said first and second pluralities of levels on a priority basis for maintaining coherency.

15. The system of claim 14 wherein said cache subsystem further includes FIFO listener means coupled to said system bus and to said directory store and to said decode and control means, said FIFO listener means in response to each memory write request applied to said system bus by another processing unit and acknowledged by said main memory, storing and subsequently presenting said each memory write request in a synchronous manner to said directory store and to said cache store during said update cycle for synchronizing the receipt of asynchronously generated request from said bus with the operation of said cache subsystem.

16. The cache unit of claim 10 wherein said directory store includes:

an even directory memory having a plurality of locations for storing a plurality of even addresses; and an odd directory memory having a plurality of locations for storing a plurality of odd addresses; and wherein said buffer memory means includes:

an even buffer memory having a plurality of storage locations associated with a different one of a plurality of even addresses; and an odd buffer memory having a plurality of storage locations associated with a different one of a pluralify of odd addresses; and said MAM means includes;

an even MAM memory; and an odd MAM memory associated with said even buffer memory and said odd buffer memory respectively.

17. The system of claim 10 wherein said first and second accounting means each include a memory containing the same number of locations as said first and second plurality of levels, said locations storing least recently used (LRU) encoded level codes for indicating the order of usage of said locations, said decode and selector circuit in the absence of said signal indicating the occurrence of said multiple allocation being conditioned to decode the LRU level code contents of said location specified by said second address portion for transfer indicating the next level into which new data is to be written into said cache store.

18. A system comprising a number of data processing subsystems and at least one main memory subsystem coupled in common to an asynchronous system bus, at least one of said data processing subsystems including a pair of processing units, each processing unit being operative to generate memory requests for data, each request including an address having first and second address portions; and a pipelined cache memory subsystem coupled to each of said processing units for receiving said data requests, said cache subsystem comprising:

input selection means for selecting a request address from one of said processing units during an allocated time slot interval;

a first pipeline cache stage coupled to said input selection means, said pipeline stage including a directory store divided into the same number of levels Xo through Xn and Yo through Yn containing groups of storage locations, each location for storing said first address portion of a memory read request generated by one of said processing units during said allocated time slot interval and each different group of locations within said directory store levels being accessed by a different one of said second address portions;

a second cache pipeline stage including a data store divided into the same number of levels Xo through Xn and Yo through Yn of said groups of locations as in said directory store and each different group of locations within said data store levels being accessible by a different one of said second address portions during a succeeding time slot interval for transfer of the date contents to the requesting one of said processing units;

first and second accounting means being associated with said levels Xo through Xn and Yo through Yn of said cache store respectively, each accounting means containing said first plurality of levels for storing information establishing the order of replacing locations within said levels on the basis of usage;

multiple allocation memory (MAM) means including the same number of levels of said groups of locations as levels Xo through Xn and Yo through Yn and each different group of locations being accessed by said second address portion; and, selector means coupled to said MAM means and to said first and second accounting means; and, decode and control means coupled to said directory store, to said MAM means, said decode and control means being operative during each allocation cycle to generate signals for indicating when the same first address portion stored in a location defined by said second address portion of one of said levels Xo through Xn allocated to one processing unit having a higher priority is being written into a location defined by the same second address portion in one of said plurality of levels Yo through Yn allocated to the other processing unit resulting in a duplicate directory entry; and said MAM means being conditioned by said decode and control means to store signals specifying one of the directory store levels Yo through Yn and a multiple allocation memory (MAM) signal indicating the occurrence of a multiple allocation, said MAM means in response to the same second address portion during a next allocation cycle in which a location specified by the same second address is being allocated in another one of said first or second pluralities levels, reading out said stored level and MAM allocation signals, said selector means being conditioned to specify said stored level from said MAM means as a replacement location eliminating said duplicate entry ensuring that coherent data is maintained in said cache store.

19. The subsystem of claim 18 wherein said directory store includes means for generating a plurality of hit signals for indicating when and the level where the requested data is stored in said cache data store and at which one of said first and second pluralities of levels.

20. The system of claim 19 wherein said decode and control means includes first programmable logic array (PLA) circuit means coupled to said means for generating for receiving said hit signals generated from reading the plurality of levels assigned to said one processing unit and to said first and second accounting means for receiving level signals indicating the next level into which new data is being written by said other processing unit, said first PLA circuit means upon detecting a match between said hit signals and said level signals generating said signals signalling said duplicate entry.

21. The system of claim 20 wherein one of said processing units is assigned a lower priority than the other processing unit, said first PLA circuit means including priority circuit means for generating said signals specifying the directory level of said duplicate entry from said processing unit having said lower priority for said immediate replacement of duplicate entries in said plurality of levels assigned to said lower priority processing unit.

22. The system of claim 21 wherein said cache subsystem coupled in common with other processing units to a system bus and wherein said decode and control means further includes second programmable logic array (PLA) circuit means coupled to said means for generating, said PLA circuit means including priority circuit means, said PLA circuit means in response to said hit signals being operative to generate hit level code signals indicating the highest priority level at which a hit was detected, said cache store being conditioned by said hit level code signals during each update cycle to update the contents of locations within said first and second pluralities of levels on a priority basis for maintaining coherency.

23. The system of claim 22 wherein said cache subsystem further includes FIFO listener means coupled to said system bus and to said directory store and to said decode and control means, said FIFO listener means in response to each memory write request applied to said system bus by another processing unit and acknowledged by said main memory, storing and subsequently presenting said each memory write request in a synchronous manner to said directory store and to said cache store during said update cycle for synchronizing the receipt of a synchronously generating request from said bus with the operation of said cache subsystem.

24. The cache unit of claim 18 wherein said directory store includes:

an even directory memory having a plurality of locations for storing a plurality of even addresses; and an odd directory memory having a plurality of locations for storing a plurality of odd addresses; and wherein said buffer memory means includes:

an even buffer memory having a plurality of storage locations associated with a different one of a plurality of even addresses; and an odd buffer memory having a plurality of storage locations associated with a different one of a plurality of odd addresses; and said MAM means includes:

an even MAM memory; and an odd MAM memory associated with said even buffer memory and said odd buffer memory respectively.

25. The system of claim 18 wherein said first and second accounting means each include a memory containing the same number of locations as said first and second pluralities of levels, said locations storing least recently used (LRU) encoded level codes for indicating the order of usage of said locations, said decode and selector circuit in the absence of said signal indicating the occurrence of said multiple allocation being conditioned to decode the LRU level code contents of said location specified by said second address portion for transfer indicating the next level into which new data is to be written into said cache store.

* * * * *